US011490416B2

(12) United States Patent
Harada et al.

(10) Patent No.: US 11,490,416 B2
(45) Date of Patent: Nov. 1, 2022

(54) USER TERMINAL, RADIO BASE STATION AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 92 days.

(21) Appl. No.: 15/761,518

(22) PCT Filed: Sep. 9, 2016

(86) PCT No.: PCT/JP2016/076561
§ 371 (c)(1),
(2) Date: Mar. 20, 2018

(87) PCT Pub. No.: WO2017/051723
PCT Pub. Date: Mar. 30, 2017

(65) Prior Publication Data
US 2018/0279366 A1 Sep. 27, 2018

(30) Foreign Application Priority Data
Sep. 24, 2015 (JP) .............................. JP2015-187383

(51) Int. Cl.
H04W 74/08 (2009.01)
H04W 72/04 (2009.01)
(Continued)

(52) U.S. Cl.
CPC ... H04W 74/0808 (2013.01); H04W 72/0446 (2013.01); H04W 72/121 (2013.01); H04W 72/1268 (2013.01); H04W 16/14 (2013.01)

(58) Field of Classification Search
CPC ......... H04W 74/0808; H04W 72/1268; H04W 72/0446; H04W 72/121; H04W 16/14; H04W 72/1289
See application file for complete search history.

(56) References Cited

U.S. PATENT DOCUMENTS 10,314,059 B2 * 6/2019 Lee .......................... H04L 5/001
10,554,340 B2 * 2/2020 Phuyal .................. H04L 1/1614
(Continued)

FOREIGN PATENT DOCUMENTS

WO 2016/098262 A1 6/2016
WO 2017022778 A1 2/2017

OTHER PUBLICATIONS

CMCC; "Discussion on issues related to UL channel access fo LAA"; 3GPP TSG RAN WG1 Meeting #82, R1-154295; Beijing, China; Aug. 24-28, 2015 (4 pages).
(Continued)

Primary Examiner — Christopher P Grey
(74) Attorney, Agent, or Firm — Osha Bergman Watanabe & Burton LLP

(57) ABSTRACT

The present invention is designed so that UL signals of a plurality of user terminals can be multiplexed and communicated in cells where listening is employed (for example, unlicensed bands). According to the present invention, a user terminal communicates with a radio base station in a cell where listening is executed before uplink (UL) signals are transmitted, and has a transmission section that transmits UL signals, and a control section that controls the transmission of UL signals based on the result of listening. The control section makes the listening period for executing listening and the transmission period for transmitting UL signals the same among a plurality of user terminals that are scheduled in the same subframe.

4 Claims, 17 Drawing Sheets

(51) Int. Cl.
*H04W 72/12* (2009.01)
*H04W 16/14* (2009.01)

(56) References Cited

U.S. PATENT DOCUMENTS

| | | | |
|---|---|---|---|
| 2014/0079015 | A1 | 3/2014 | Kim et al. |
| 2016/0323852 | A1* | 11/2016 | Golitschek Edler von Elbwart ... H04L 1/1887 |
| 2017/0150367 | A1* | 5/2017 | Han .................. H04L 5/001 |
| 2017/0196020 | A1* | 7/2017 | Mukherjee ......... H04W 74/004 |
| 2017/0265226 | A1 | 9/2017 | Yano et al. |
| 2018/0048498 | A1* | 2/2018 | Stern-Berkowitz ......... H04L 5/0048 |
| 2018/0220462 | A1 | 8/2018 | Kusashima et al. |
| 2019/0123779 | A1* | 4/2019 | Ekpenyong ............ H04B 1/56 |

OTHER PUBLICATIONS

ETRI; "Discussion on UL grant for LAA"; 3GPP TSG RAN WG1 Meeting #80bis, R1-152095; Belgrade, Serbia; Apr. 20-24, 2015 (5 pages).
Fujitsu; "Design of LAA UL transmission"; 3GPP TSG RAN WG1 Meeting #80, R1-150186; Athens, Greece; Feb. 9-13, 2015 (3 pages).
Samsung; "Discussion on Category 2 LBT for UL transmission"; 3GPP TSG RAN WG1 Meeting #82, R1-154138; Beijing, China; Aug. 24-28, 2015 (5 pages).
Alcatel-Lucent Shanghai Bell, et al.; "UL LBT and DL/UL Frame Structure for LAA"; 3GPP TSG RAN WG1 Meeting #82, R1-154574; Beijing, China; Aug. 25-28, 2015 (6 pages).
InterDigital Communications; "On Scheduling and HARQ operation for LAA"; 3GPP TSG-RAN WG1 Meeting #81, R1-153144; Fukuoka, Japan; May 25-29, 2015 (3 pages).
ZTE; "Potential design for LAA UL transmission"; 3GPP TSG RAN WG1 Meeting #80bis, R1-151719; Belgrade, Serbia; Apr. 20-24, 2015 (5 pages).
NTT Docomo, Inc.; "Discussion on channel access framework for potential LAA UL"; 3GPP TSG RAN WG1 Meeting #82bis, R1-155900; Malmö, Sweden; Oct. 5-9, 2015 (6 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
AT&T; "Drivers, Benefits and Challenges for LTE in Unlicensed Spectrum"; 3GPP TSG-RAN Meeting #62, RP-131701; Busan, Korea; Dec. 3-6, 2013 (3 pages).
International Search Report of the International Searching Authority issued in PCT/JP2016/076561 dated Nov. 1, 2016 (2 pages).
Written Opinion of the International Searching Authority issued in PCT/JP2016/076561 dated Nov. 1, 2016 (5 pages).
Extended European Search Report issued in the counterpart European Patent Application No. 16848511.8, dated Mar. 20, 2019 (8 pages).
Office Action issued in the counterpart Japanese Patent Application No. 2017-541514, dated Aug. 7, 2018 (8 pages).
Office Action issued in European Application No. 16848511.8, dated Jun. 26, 2020 (4 pages).

* cited by examiner

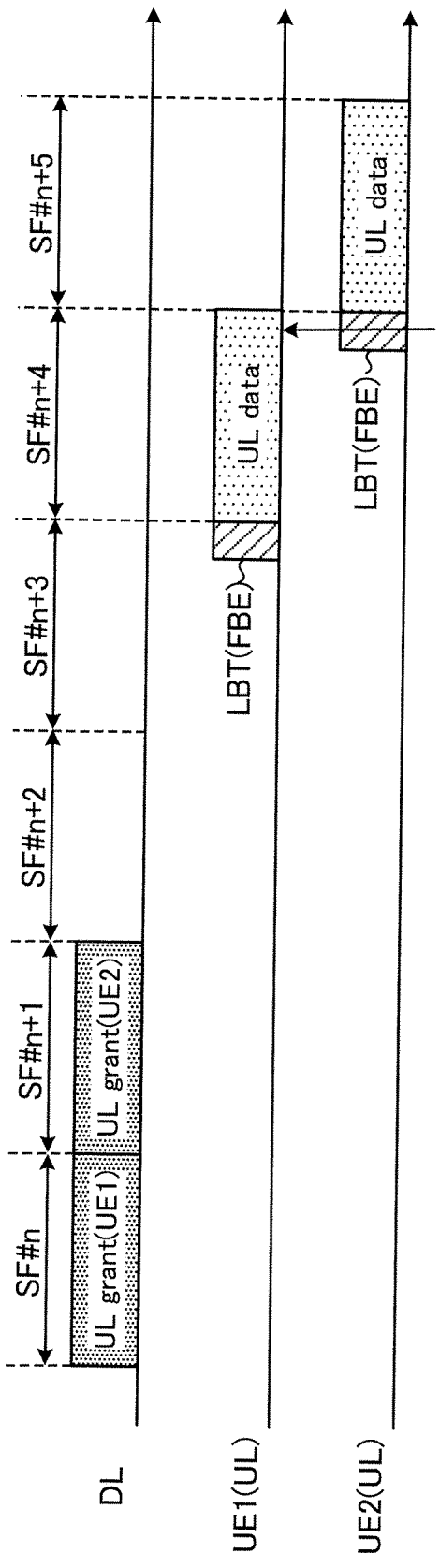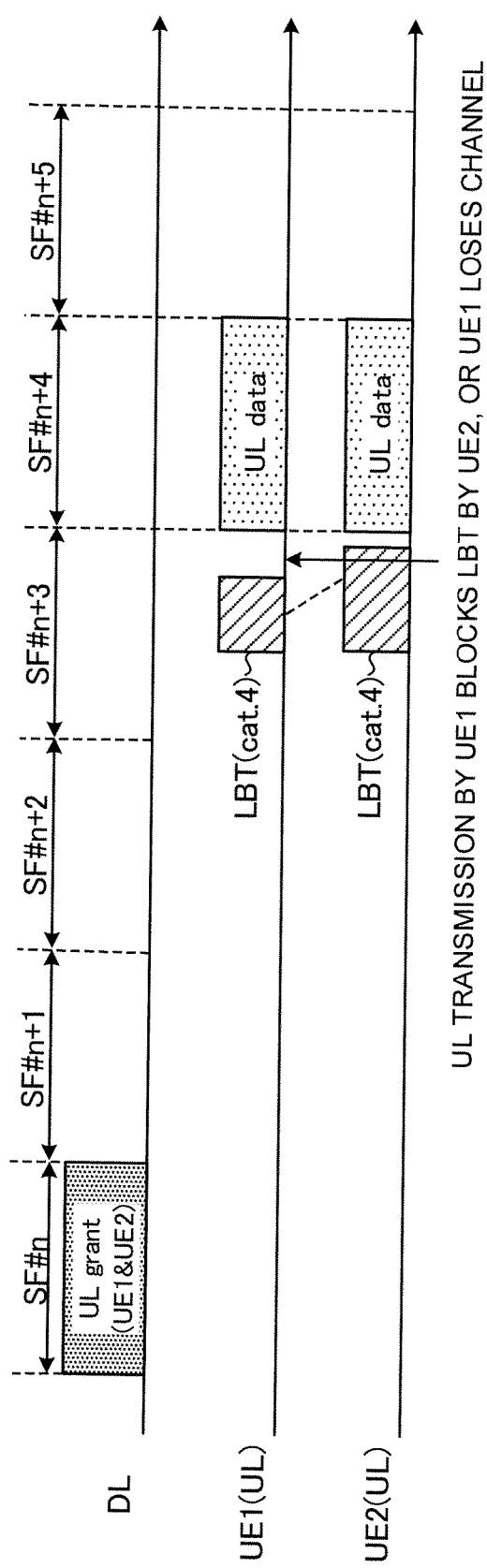

| UL index or 2 new bits | Subframe offset |
|---|---|
| 00 | 4 |
| 01 | 5 |
| 10 | 6 |
| 11 | 7 |

| 2 new bits | Multiple Subframes' offset |
|---|---|
| 00 | 4 |
| 01 | 4,5 |
| 10 | 5,6 |
| 11 | 4,5,6 |

FIG. 7B

| 2 new bits | Multiple Subframes' offset |
|---|---|
| 00 | 4 |
| 01 | 4,5 |
| 10 | 4,6 |
| 11 | 5,6 |

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Furthermore, successor systems of LTE (referred to as, for example, "Rel. 13," "LTE-A" (LTE-Advanced), "FRA" (Future Radio Access), "5G" (5th generation mobile communication system) and so on) are also under study for the purpose of achieving further broadbandization and increased speed beyond LTE.

In LTE of Rel. 8 to 12, the specifications have been drafted assuming exclusive operations in frequency bands that are licensed to operators—that is, licensed bands. As licensed bands, for example, 800 MHz, 2 GHz and/or 1.7 GHz are used.

User traffic has been increasing steeply following the spread of high-performance user terminals/user equipment (referred to as "UE") such as smart-phones and tablets. Although more frequency bands need to be added to meet this increasing user traffic, licensed bands have limited spectra (licensed spectra). Consequently, a study is in progress to enhance the frequencies of LTE systems by using bands of unlicensed spectra (hereinafter referred to as "unlicensed bands") that are available for use apart from licensed bands (see non-patent literature 2).

For unlicensed band, for example, 2.4 GHz, which is the same as in Wi-Fi (registered trademark), or the 5 GHz band and/or the like may be used. With Rel. 13 LTE, a study is in progress to execute carrier aggregation (CA) between licensed bands and unlicensed bands. Communication that is carried out by using unlicensed bands with licensed bands like this is referred to as "LAA" (License-Assisted Access). In the future, dual connectivity (DC) between licensed bands and unlicensed bands and stand-alone in unlicensed bands may become the subject of study under LAA.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"
Non-Patent Literature 2: AT&T, Drivers, Benefits and Challenges for LTE in Unlicensed Spectrum, 3GPP TSG-RAN Meeting #62 RP-131701

SUMMARY OF INVENTION

Technical Problem

A study is in progress to introduce interference control functionality to unlicensed bands, in order to allow co-presence with other operators' LTE, Wi-Fi or different systems. In Wi-Fi, LBT (Listen Before Talk), which is based on CCA (Clear Channel Assessment), is used as an interference control function within the same frequency. Consequently, when unlicensed bands are configured in LTE systems, uplink (UL) transmission may be controlled by implementing "listening" (for example, LBT) as an interference control function.

Also, when unlicensed bands are configured in LTE systems, a plurality of user terminals may be multiplexed in UL transmission. For example, UL signals of a plurality of user terminals may be frequency-division-multiplexed on the same subframe (FDM: Frequency Division Multiplexing), or may be space-division-multiplexed by multi-user MIMO (Multiple-Input and Multiple-Output) (SDM: Space Division Multiplexing).

However, when a plurality of user terminals are multiplexed in UL transmission in an unlicensed band, these multiple user terminals may be unable to transmit UL signals adequately because these user terminals block each other.

The present invention has been made in view of the above, and it is therefore an object of the present invention to provide a user terminal, a radio base station and a radio communication method, whereby UL signals of a plurality of user terminals can be multiplexed and communicated in cells where listening is employed (for example, unlicensed bands).

Solution to Problem

According to one aspect of the present invention, a user terminal communicates with a radio base station in a cell where listening is executed before uplink (UL) signals are transmitted, and has a transmission section that transmits UL signals, and a control section that controls the transmission of UL signals based on the result of listening, and the control section makes the listening period for executing listening and the transmission period for transmitting UL signals the same among a plurality of user terminals that are scheduled in the same subframe.

According to another aspect of the present invention, a user terminal communicates with a radio base station in a cell where listening is executed before uplink (UL) signals are transmitted, and has a receiving section that receives subframe information, which represents one or a plurality of subframes that are scheduled for the user terminal, a transmission section that transmits a UL signal in the one or the plurality of subframes, and a control section that controls the transmission of UL signals based on the result of listening, and the control section makes the listening period for executing listening the same among a plurality of user terminals that are scheduled in one or a plurality of subframes in the same burst transmission period.

Advantageous Effects of Invention

According to the present invention, it is possible to multiplex and transmit UL signals of a plurality of user terminals in cells where listening is employed (for example, unlicensed bands).

BRIEF DESCRIPTION OF DRAWINGS

FIGS. 2A and 2B provide diagrams to show examples of UL transmission in an unlicensed band;

FIG. 6 is a diagram to show an example of subframe information according to the second example;

FIGS. 7A and 7B provide diagrams to show other examples of subframe information according to the second example;

DESCRIPTION OF EMBODIMENTS

Figure 1A:
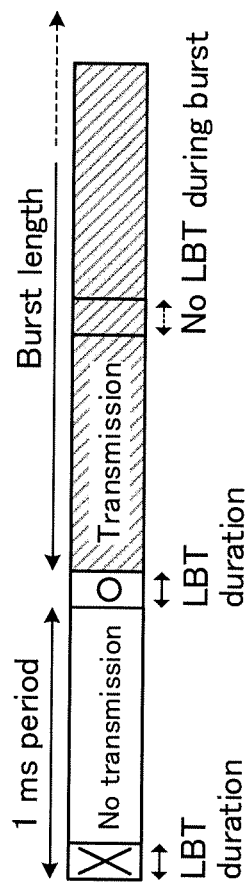
FIGS. 1A and 1B provide diagrams, each showing an example of a radio frame configuration in LBT.

As mentioned earlier, in unlicensed bands, interference control functionality is likely to be necessary in order to allow co-presence with other operators' LTE, Wi-Fi (registered trademark), or other different systems. In Wi-Fi, the function called "LBT" (Listen Before Talk), which is based on CCA (Clear Channel Assessment), is implemented as an interference control function for use within the same frequency. In Japan and Europe, the LBT function is stipulated as mandatory in systems that are run in the 5 GHz unlicensed band, such as Wi-Fi.

Consequently, a study is in progress to apply interference control within the same frequency by executing listening before transmitting signals even in systems where LTE/LET-A is run in unlicensed bands (for example, LAA systems). In a carrier in which listening is configured, radio base stations and user terminals of a plurality of systems may use the same frequency bands on a shared basis.

The application of listening makes it possible to prevent interference between LAA and Wi-Fi, interference between LAA systems, and so on.

Furthermore, even when user terminals that can be connected are controlled independently for every operator that runs an LAA system, it is possible to reduce interference without learning the details of each operator's control, by means of listening.

Here, "listening" refers to the operation which a given transmission point (for example, a radio base station, a user terminal, etc.) performs before transmitting signals in order to check whether or not signals to exceed a predetermined level (for example, predetermined power) are being transmitted from other transmission points. Also, this "listening" performed by radio base stations and/or user terminals may be referred to as "LBT" (Listen Before Talk), "CCA" (Clear Channel Assessment), "carrier sensing" and so on.

For example, when LBT is employed in an LTE system, a transmission point (an LTE-U base station and/or a user terminal) performs listening (LBT, CCA) before transmitting UL signals and/or DL signals in an unlicensed band. Then, if no signals from other systems (for example, Wi-Fi) and/or other LAA transmission points are detected, the transmission point carries out communication in the unlicensed band.

If received power that is equal to or lower than a predetermined threshold is measured in LBT, the transmission point judges that the channel is in the idle state (LBT-idle), and carries out transmission. When a "channel is in the idle state," this means that, in other words, the channel is not occupied by a certain system, and it is equally possible to say that a channel is "idle," a channel is "clear," a channel is "free," and so on.

On the other hand, when the received power that is measured in LBT exceeds a predetermined threshold, the transmission point judges that the channel is in the busy state (LBT-busy), and limits transmission.

Procedures that are taken when listening yields the result "LBT-busy" include (1) making a transition to another carrier by way of DFS (Dynamic Frequency Selection), (2) applying transmission power control (TPC), (3) holding transmission (stopping transmission or waiting for transmission), and so on. In the event LBT-busy is yielded, LBT is carried out again with respect to this channel, and the channel becomes available for use only after it is confirmed that the channel is in the idle state. Note that the method of judging whether a channel is in the idle state/busy state based on LBT is by no means limited to this.

For example, assume a case where, when a user terminal that communicates by using a carrier (which may also be referred to as a "frequency," a "cell," a "component carrier" (CC)) of an unlicensed band detects another entity (another user terminal and/or the like) that is communicating in this unlicensed band carrier, transmission is banned in this carrier. In this case, this user terminal executes LBT at a timing that is a predetermined period ahead of a transmission timing.

By executing LBT, the user terminal searches the whole band of the applicable carrier at a timing that is a predetermined period ahead of a transmission timing, and checks whether or not other devices (radio base stations, LAA-UEs, Wi-Fi devices and so on) are communicating in this carrier's band. Only if it is confirmed that no such communication is in progress, is transmission carried out using this carrier.

On the other hand, if only just a portion of the band is detected to be used by another device—that is, if the received power of a signal from another device entering this band exceeds a threshold—the user terminal stops its transmission. Here, if the received signal power in the LBT duration is higher than a predetermined threshold, the channel is judged to be in the busy state (busy state). If the received signal power in the LBT duration is lower than the predetermined threshold, the channel is judged to be in the idle state (LBT-idle).

Also, LBT mechanisms include, roughly, LBE (Load-Based Equipment) and FBE (Frame-Based Equipment). FBE executes carrier sensing in fixed timings and in a fixed cycle, and starts transmission if the idle state is detected, or waits until the next carrier sensing timing if the busy state is detected. That is, FBE has a fixed frame cycle, and is a mechanism of carrying out transmission if the result of executing carrier sensing in a predetermined frame shows that a channel is available for use, and not making transmission but waiting until the next carrier sensing timing if no channel can be used.

In LBE (also referred to as "category 4"), initial CCA is executed, and transmission is started if the idle state is detected, or the ECCA (Extended CCA) procedure is executed if the busy state is detected. That is, LBE refers to a mechanism of extending the carrier sensing duration when the result of carrier sensing shows that the channel cannot be used, and continuing executing carrier sensing until the channel becomes available for use. In LBE, random backoff is required to avoid contention adequately.

FIG. 1 provide diagrams, each showing an example of a radio frame configuration in LBT. FIG. 1A shows an example of an FBE radio frame configuration. In FBE, the LBT duration to perform carrier sensing and the LBT cycle are fixed, and LBT (CCA) is executed for a predetermined duration (for example, 25 μs), in a predetermined cycle (for example, every 1 ms).

Figure 1B:
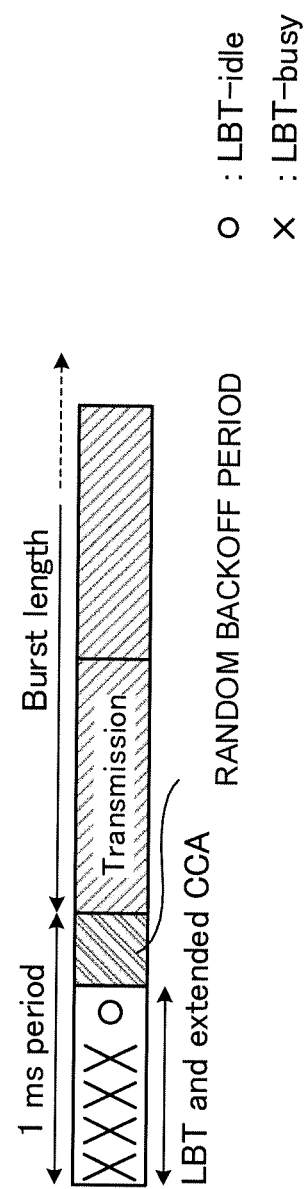

Meanwhile, FIG. 1B shows an example of an LBE (category 4) radio frame configuration. In LBE, the LBT duration is not fixed, and may include a different defer period per transmission point (extended CCA). Furthermore, in LBE, in order to reduce collisions among a plurality of transmission points, each transmission point does not start transmission soon even when a channel assumes the idle state, but holds transmission for a randomly-configured period in order to reduce the likelihood of collisions among a plurality of transmission points (random backoff). The random backoff period can be determined based on counter values (random values), which are configured on a random basis. The range of counter values is determined based on the contention window (CW) size, and, for example, the counter values are configured on a random basis from the range of 1 to the CW size (integer value).

Note that, when, in both FIG. 1A and FIG. 1B, the result of carrier sensing (LBT) for UL transmission shows the idle state, a user terminal is allowed to skip LBT and transmit UL signals, for a predetermined period (burst transmission). This predetermined period is also referred to as a "burst period," "burst length," "maximum burst length," "maximum possible burst length" and so on.

As described above, when an unlicensed band is configured in an LTE system, listening (carrier sensing, LBT and so on) may be executed based on FBE or LBE (category 4). However, when a plurality of user terminals are multiplexed in unlicensed band UL transmission, there is a threat that listening cannot be performed adequately based on FBE or LBE (category 4).

FIG. 2 provide diagrams to show examples of UL transmission in an unlicensed band. FIG. 2A shows an example of listening based on FBE. As shown in FIG. 2A, when UL grants for user terminals 1 and 2 are transmitted in subframes #n and #n+1, user terminal 1 executes LBT in subframe #n+3, and, when judging on the idle state, makes UL transmission in subframe #n+4. Meanwhile, although user terminal 2 performs LBT in subframe #n+4 as well, this yields the busy state due to (blocked by) UL transmission by user terminal 1, and, consequently, it is not possible to carry out UL transmission in subframe #n+5.

FIG. 2B shows an example of listening based on LBE (category 4). As shown in FIG. 2B, when a UL grant for user terminals 1 and 2 is transmitted in subframe #n, user terminals 1 and 2 each perform LBT in subframe #n+3. In LBE-based LBT, user terminals 1 and 2 have varying LBT durations. Consequently, in FIG. 2B, if user terminal 1 starts UL transmission soon after successfully detecting the idle state, user terminal 2 judges on the busy state due to (blocked by) UL transmission from user terminal 1, and is unable to make UL transmission in subframe #n+4. Meanwhile, unless UL transmission is started soon after user terminal 1 successfully detects the idle state, there is a threat that the idle channel that is detected may be taken by another system.

As described above, when a plurality of user terminals are multiplexed in unlicensed band UL transmission, there is a threat that these multiple user terminals block each other and are unable to transmit UL signals adequately.

So, presuming the case where listening is employed in an LTE system (LAA), the present inventors have come up with the idea of controlling the timings of listening and/or UL transmissions to prevent user terminals that are multiplexed upon UL transmission from blocking each other.

Now, the present embodiment will be described in detail below with reference to the accompanying drawings. Although the present embodiment will be described assuming that a frequency carrier in which listening (LBT) is not configured is a licensed band and a frequency carrier in which listening is configured is an unlicensed band, this is by no means limiting. The present embodiment is applicable to any carriers (or cells) in which listening is configured, regardless of whether a carrier is a licensed band or an unlicensed band.

Also, although the following description will suitably apply to UL transmission—in particular, uplink user data transmission control based on UL transmission commands (UL grants) reported from the radio base stations—the present embodiment is by no means limited to this. The present embodiment is equally applicable to the transmission control of, for example, uplink control information (for example, ACKs/NACKs, aperiodic channel state information (A-CSI), aperiodic sounding reference signals (A-SRSs), and so on), besides uplink user data.

Also, although cases will be shown in the following description where listening is employed in LTE systems, the present embodiment is by no means limited to this. The present embodiment is applicable to any systems that execute listening before transmitting signals.

First Example

A case will be described with the first example where LBT is executed based on FBE (FIG. 1A). According to the first example, the FEB-based LBT duration (listening period) and the UL transmission period (transmission period) are fixed (the same) among a plurality of user terminals that are scheduled in the same subframe.

According to the first example, an LBT duration is provided at the end or the top of each UL subframe, apart from the UL transmission period. A user terminal performs FBE-based LBT in the LBT duration that is provided at the end of a UL subframe immediately before a scheduled UL subframe or that is provided at the top of the scheduled UL subframe. The user terminal performs UL transmission in the UL transmission period in the scheduled UL subframe, based on the result of LBT.

Figure 3A:
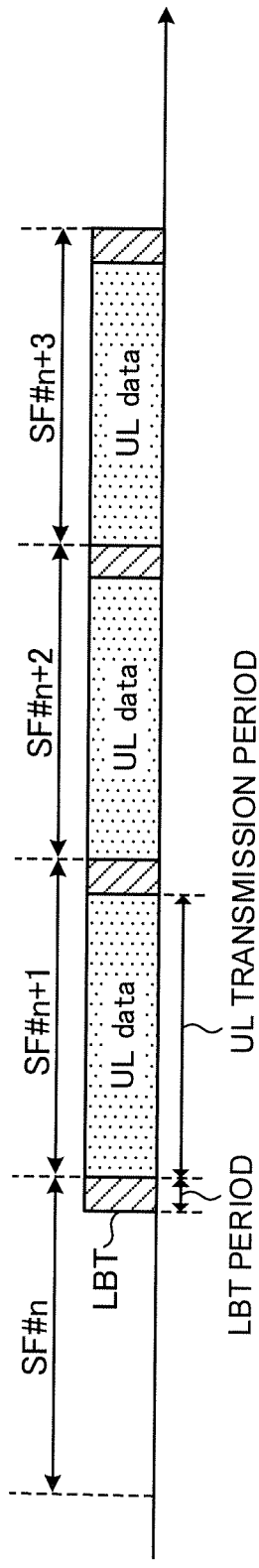
FIGS. 3A and 3B provide diagrams to show examples of UL transmission based on LBT (FBE), according to a first example.

FIG. 3 provide diagrams to show examples of UL transmission according to the first example. In FIG. 3A, an LBT duration that applies in common to user terminals in an unlicensed band cell is configured at the end of a UL subframe, apart from the UL transmission period. As shown in FIG. 3A, when UL subframes #n+1 to #n+3 are scheduled, each user terminal makes UL transmission in subframes #n+1 to #n+3 based on the result of LBT in the LBT duration provided at the end of immediately-preceding UL subframes #n to #n+2.

Figure 3B:
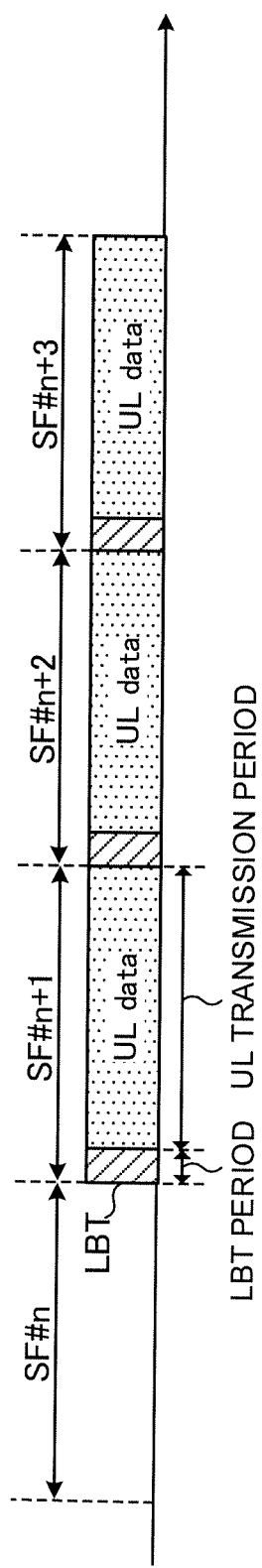

Meanwhile, in FIG. 3B, an LBT duration that applies in common to the user terminals in the unlicensed band cell is configured at the end of a UL subframe, apart from the UL transmission period. To be more specific, as shown in FIG. 3B, when UL subframes #n+1 to #n+3 are scheduled, the user terminals perform LBT in the LBT durations provided at the top of subframes #n+1 to #n+3.

In FIGS. 3A and 3B, LBT durations are provided on a per UL subframe basis, so that the UL transmission period becomes shorter than one UL subframe (1 ms). Also, in UL subframes #n+1 to #n+3, UL signals of a plurality of user terminals that are scheduled may be frequency-division-multiplexed or space-division-multiplexed.

According to the first example, an LBT duration that applies in common to all the user terminals in an unlicensed band cell is provided at the end or the top of UL a subframe, apart from the UL transmission period.

Consequently, it is possible to prevent the situation where one user terminal's LBT blocks another user terminal's UL transmission in the same cell.

Note that information about the timings of the LBT durations in FIGS. 3A and 3B (for example, the cycle, the period, the offset with respect to the top of the subframe, etc.) may be configured in user terminals in advance, or may be configured by higher layer signaling (for example, RRC (Radio Resource Control) signaling, broadcast information and so on) from the radio base station.

Also, information about the timings of the UL transmission periods in FIGS. 3A and 3B (for example, the cycle, the period, the offset with respect to the top of the subframe, etc.) may be configured in user terminals in advance, may be configured by higher layer signaling from the radio base station (for example, RRC (Radio Resource Control) signaling, broadcast information and so on), or may be estimated by user terminals based on the LBT durations.

Second Example

A case of performing FBE-based LBT will be described with a second example. According to the second example, a plurality of user terminals that are scheduled in one or a plurality of subframes in the same UL burst transmission period (burst transmission period) use a fixed (the same) FBE-based LBT duration (listening period).

According to the second example, an LBT duration is configured before a UL burst transmission period, in which at least one UL subframe is included. The UL subframes in the UL burst transmission period are scheduled for each user terminal, and based on the result of LBT in this LBT duration, each user terminal make UL transmission in its scheduled UL subframe. In the UL burst transmission period, LBT is skipped.

Figure 4:
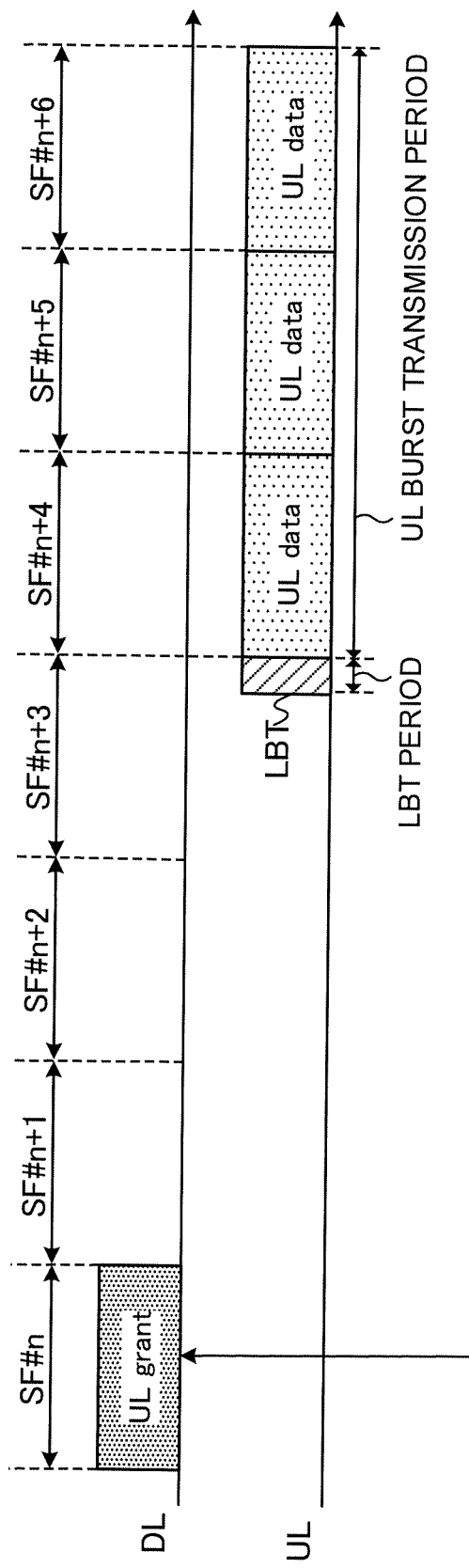
FIG. 4 is a diagram to show an example of UL transmission based on LBT (FBE), according to a second example.

FIG. 4 is a diagram to show an example of UL transmission according to the second example. In FIG. 4, an LBT duration that applies in common to user terminals where UL subframes #n+4 to #n+6 in a UL burst transmission period are scheduled is configured at the end of a UL subframe that is immediately before the UL burst transmission period.

For example, assume that, in DL subframe #n in FIG. 4, UL grant that schedules UL subframes #n+4 and #n+5 for user terminal 1, a UL grant that schedules UL subframe #n+5 for user terminal 2, UL grant that schedules UL subframe #n+6 for user terminal 3, and UL grant that schedules UL subframe #n+6 for user terminal 4 are transmitted. Note that the method of scheduling UL subframes in the UL burst transmission period will be described in detail later.

In this case, user terminals 1 to 4 each execute LBT in the LBT duration configured at the end of UL subframe #n+3 that is immediately before the UL burst transmission period. Also, based on the result of LBT, user terminals 1 to 4 make UL transmission in the UL subframes scheduled by the UL grants. Note that LBT is skipped during the UL burst transmission period.

Meanwhile, in FIG. 4, user terminals 2 to 4 do not make UL transmission soon after the LBT duration is finished, and therefore there is a threat that other systems (for example, Wi-Fi) that run in unlicensed bands cut in during the period between the end of the LBT duration and the beginning of UL transmission. So, user terminals 2 to 4 may prevent other systems from interrupting, by transmitting reservation signals by using part of the frequency resources (for example, part of the physical resource blocks (PRBs) or the subcarriers) used in the unlicensed band cell (carrier).

Figure 5:
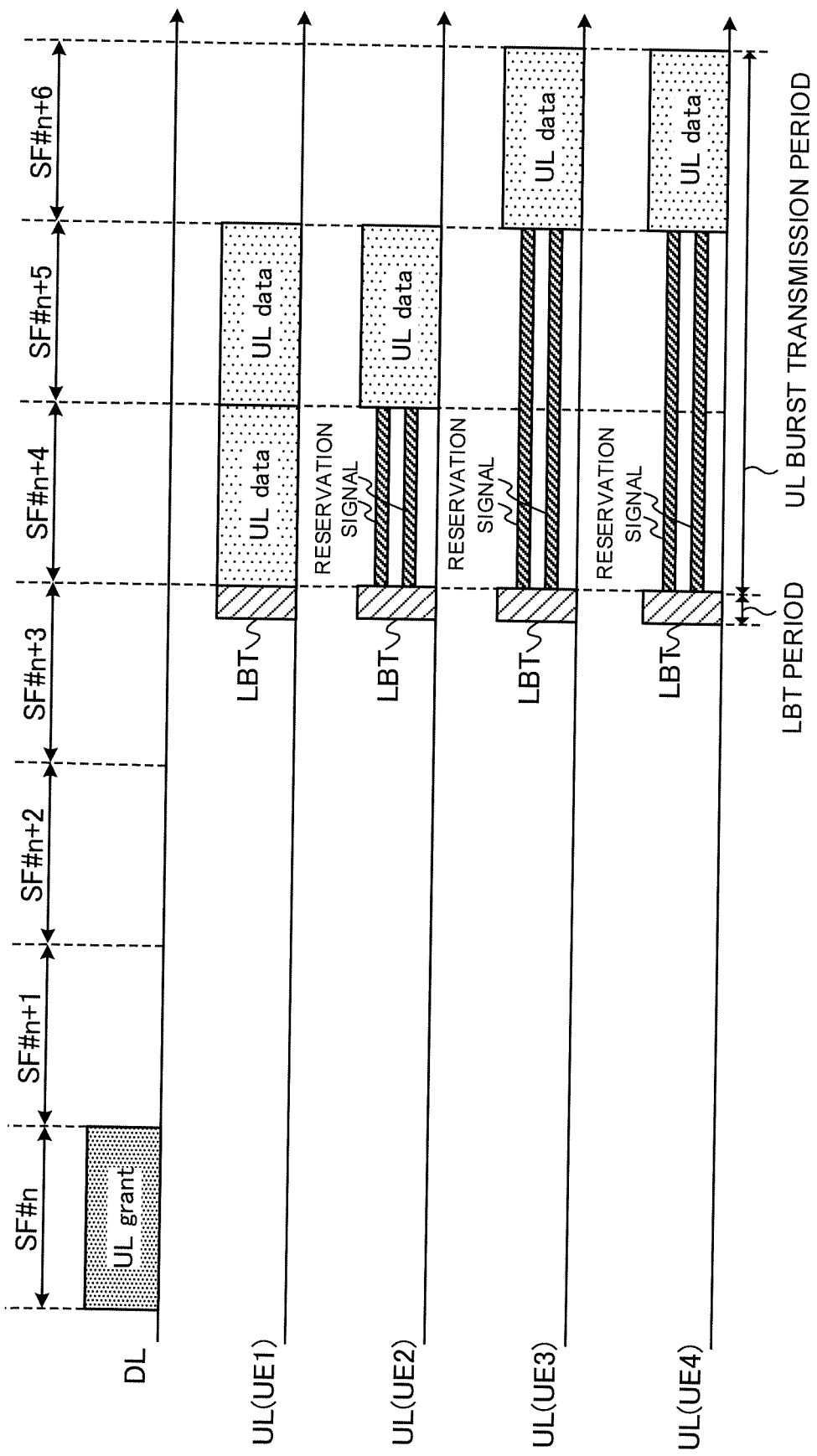
FIG. 5 is a diagram to show another example of UL transmission based on LBT (FBE), according to the second example.

FIG. 5 is a diagram to show another example of UL transmission according to the second example. Assume that, in FIG. 5, a UL grant for user terminals 1 to 4 is transmitted in DL subframe #n, as in FIG. 4. As shown in FIG. 5, user terminal 1 where UL subframes #n+4 and #n+5 are scheduled performs UL transmission following an LBT duration.

Meanwhile, user terminal 2 where UL subframe #n+5 is scheduled transmits reservation signals by using part of the frequency resources of the licensed band during the period between the end of the LBT duration and the beginning of UL transmission (subframe #n+4). Similarly, user terminal 3 and 4 where UL subframe #6 is scheduled transmit reservation signals during the period between the end of an LBT duration and the beginning of UL transmission (subframes #n+4 and #n+5) by using part of the frequency resources of the licensed band.

In FIG. 5, the frequency resources in which the reservation signals are transmitted may be cell-specific, or may be user terminal-specific. When cell-specific frequency resources are used, the radio base station may control UL transmission (for example, UL transmission in user terminal 1) not to be allocated to the frequency resources for reservation signals. Meanwhile, when user terminal-specific frequency resources are used, the radio base station may cancel interference from the reservation signals and demodulate data from UL signals (for example, UL signals of user terminal 1).

Also, in FIG. 5, part of the frequency resources in which reservation signals are transmitted are two discontinuous frequency resources this is by no means limiting. Note that information about the timings of LBT durations in FIGS. 4 and 5 (for example, the cycle, the period, the offset with respect to the top of the subframe, etc.) may be configured in user terminals in advance, or may be configured by higher layer signaling from the radio base station.

<Scheduling Method>

The scheduling of UL subframes in a UL burst transmission period (cross-subframe scheduling) according to the second example will described in detail below.

To each user terminal where UL subframes in a UL burst transmission period are scheduled, the radio base station transmits downlink control information (DCI), in which subframe information to represent the scheduled UL subframes is included, by using a downlink control channel (for example, the PDCCH (Physical Downlink Control Channel) or the EPDCCH (Enhanced Physical Downlink Control Channel)).

A bit value to represent the offset (difference) between the subframe, in which a UL grant (DCI) to schedule a UL subframe in the UL burst transmission period is transmitted, and this UL subframe, may be an example of the above subframe information, but this is by no means limiting.

FIG. 6 is a diagram to show an example of subframe information according to the second example. As shown in FIG. 6, the radio base station may transmit a bit value to represent the offset (difference) between the subframe, in which a UL grant to schedule a UL subframe in a UL burst transmission period is transmitted, and this UL subframe, to a user terminal, as the above subframe information. In FIG. 6, each bit value represents a single offset (that is, a single UL subframe). Note that each value may represent an offset that is not shown in FIG. 6. Also, the number of bits may be changed as appropriate depending on the number of offsets.

Here, these offset-representing bit values may be arranged in an information field that is newly added in DCI in which the above UL grants are included (for example, DCI format 0 or 4). Alternatively, the offset-representing bit values may be arranged in an UL index field for TDD configuration 0 in DCI (DCI format 0 or 4) where the above UL grants are included.

For example, in DL subframe #n in FIGS. 4 and 5, the radio base station transmits DCI that includes the above bit values "01," to user terminal 2 where UL subframe #5 is scheduled. Based on the offset "5" represented by the above bit values "01," user terminal 2 carries out UL transmission in UL subframe #n+5, which is five subframes after DL subframe #n.

Also, in DL subframe #n in FIGS. 4 and 5, the radio base station transmits DCI to include the above bit values "00" and DCI to include the above bit values "01" to user terminal 1 where a plurality of UL subframes #4 and #5 are scheduled. User terminal 1 makes UL transmission in UL subframe #n+4 based on the offset "4" represented by the above bit values "00," and, furthermore, makes UL transmission in UL subframe #n+4 based on the offset "5" represented by the above bit values "01."

In this way, when each bit value represents a single offset (see FIG. 6), a plurality of pieces of DCI, each including a different bit value, are transmitted, so that a radio base station can schedule a plurality of UL subframes in a UL burst transmission period for user terminals.

Meanwhile, the radio base station may schedule a plurality of UL subframes in a UL burst transmission period based on a single piece of DCI. FIG. 7 is a diagram to show another example of subframe information according to the second example. As shown in FIG. 7, the radio base station may transmit a bit value to represent the offset (difference) between the subframe, in which a UL grant to schedule at least one UL subframe in a UL burst transmission period is transmitted, and this UL subframe, to a user terminal, as the above subframe information.

In FIG. 7A, each bit value represents a single offset or a plurality of consecutive offsets (That is, a plurality of consecutive UL subframes). Meanwhile, in FIG. 7B, each bit value represents a single offset or a plurality of offsets that are consecutive or not consecutive (that is, a plurality of UL subframes that are consecutive or not consecutive).

In FIG. 7A and FIG. 7B, at least one offset, represented by the above bit values, may be configured in a user terminal in advance by higher layer signaling from the radio base station (for example, RRC signaling, broadcast information, etc.). Note that each value may represent an offset that is not shown in FIG. 7. Also, the number of bits can be changed appropriate depending the combination of offsets.

For example, in DL subframe #n in FIGS. 4 and 5, the radio base station transmits a single piece of DCI, which includes the bit values "01" of FIGS. 7A and 7B, to user terminal 1 where a plurality of UL subframes #4 and #5 are scheduled. User terminal 1 makes UL transmission in UL subframes #n+4 and #n+5 based on the offsets "4" and "5" represented by the above bit values "01."

In this way, when bit values represent a plurality of offsets (see FIG. 7), a single piece of DCI, in which bit values to represent a plurality of offsets, is transmitted, so that a radio base station can schedule a plurality of UL subframes in a UL burst transmission period for user terminals.

As described above, according to the second example, an LBT duration that applies in common to user terminals where UL subframes in a UL burst transmission period are scheduled is provided before a UL burst transmission period. Consequently, it is possible to prevent the situation in which LBT executed by one user terminal where a UL subframe in a UL burst transmission period is scheduled blocks another user terminal's UL transmission.

Third Example

A case will be described with a third example where LBT is executed based on LBE (category 4) (FIG. 1B). According to the third example, the duration of LBT (listening period) based on LBE (category 4) and the UL transmission period (transmission period) are fixed (the same) among a plurality of user terminals scheduled in the same subframe.

Although, typically, the LBT duration varies on a per user terminal basis in LBE (category 4), according to the third example, an LBT duration (for example, a predetermined number of symbols) that applies in common to user terminals is provided at the end or at the top of each UL subframe, apart from the UL transmission period. A user terminal performs LBE-based LBT in the LBT duration, provided at the end of a UL subframe immediately before a scheduled UL subframe or that is provided at the top of the scheduled UL subframe. The user terminal performs UL transmission in UL transmission periods that start at fixed starting timings, regardless of the timing LBT is finished.

Figure 8A:
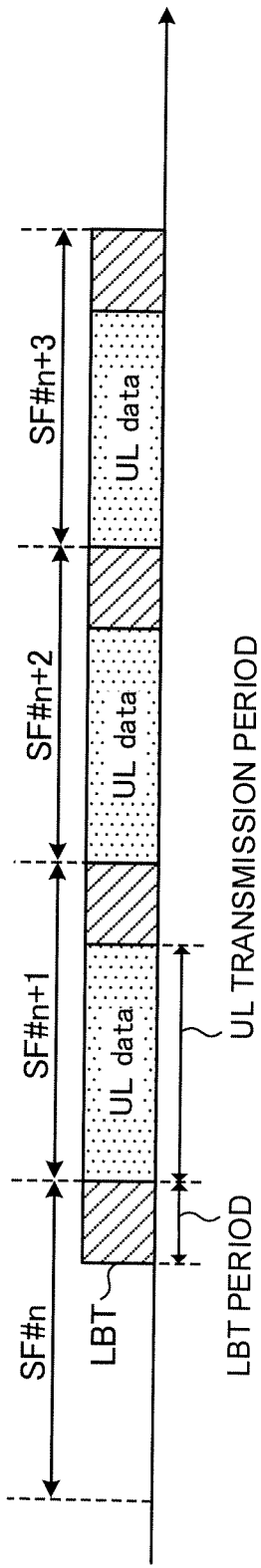
FIGS. 8A and 8B provide diagrams to show examples of UL transmission based on LBT (LBE), according to a third example.

FIG. 8 provide diagrams to show examples of UL transmission according to the third example. In FIG. 8A, an LBT duration that applies in common to user terminals in an unlicensed band cell is configured at the end of a UL subframe, apart from the UL transmission period. As shown in FIG. 8A, when UL subframes #n+1 to #n+3 are scheduled, the user terminals make UL transmission in UL subframes #n+1 to #n+3 based on the results of LBT in the LBT durations provided at the end of immediately-preceding UL subframe #n to #n+2.

Figure 8B:
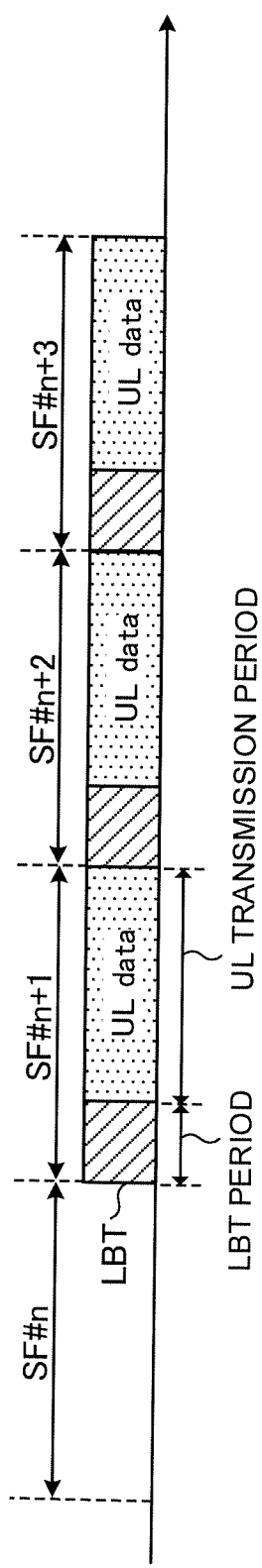

Meanwhile, in FIG. 8B, an LBT duration that applies in common to the user terminals in the unlicensed band cell is configured at the top of a UL subframe, apart from the UL transmission period. To be more specific, as shown in FIG. 8B, when UL subframes #n+1 to #n+3 are scheduled, the user terminals perform LBT in the LBT durations provided at the top of subframes #n+1 to #n+3.

In FIGS. 8A and 8B, LBT durations are provided on a per UL subframe basis, so that the UL transmission period becomes shorter than one UL subframe (1 ms). Also, in UL subframes #n+1 to #n+3, UL signals of a plurality of user terminals that are scheduled may be frequency-division-multiplexed or space-division-multiplexed.

Also, when a user terminal fails to detect the idle state in the LBT durations in FIGS. 8A and 8B, the user terminal stops (drops) UL transmission in the scheduled UL subframe. On the other hand, when the user terminal successfully detects the idle state in the LBT durations in FIGS. 8A and 8B, the user terminal holds UL transmission until a UL transmission period starts at a fixed starting timing.

Note that information about the timings of LBT durations in FIGS. 8A and 8B (for example, the cycle, the period, the offset with respect to the top of the subframe, etc.) may be configured in user terminals in advance, or may be configured by higher layer signaling from the radio base station.

Also, information about the timings of the UL transmission periods in FIGS. 8A and 8B (for example, the cycle, the period, the offset with respect to the top of the subframe, etc.) may be configured in user terminals in advance, may be configured by higher layer signaling from the radio base station, or may be estimated by user terminals based on the LBT durations.

Figure 9:
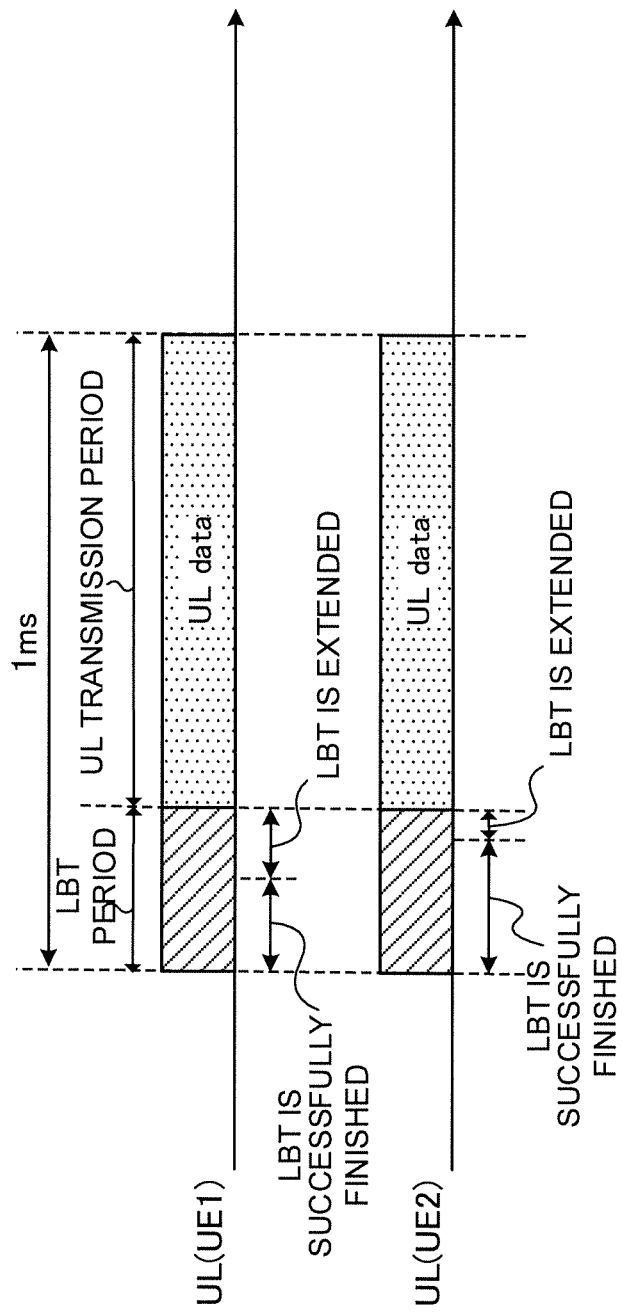
FIG. 9 is a diagram to show an example of the occurrence of an interrupt according to the third example.

Now, as shown in FIG. 9, when a user terminal waits until a UL transmission period starts at a fixed starting timing, there is a threat that other systems (for example, Wi-Fi) might cut in during the period between a successful end of LBT in an LBT duration and the beginning of a UL transmission period. Now, the method of preventing such an interrupt (without losing the opportunity to access the channel that is detected to be in the idle state) and guaranteeing UL transmission in the user terminal that has successfully finished LBT will be described with reference to FIGS. 10 and 11.

Note that an example case will be described with reference to FIGS. 9 to 11 where the same UL subframe is scheduled user terminals 1 and 2, and where LBT (carrier sensing) based on LBE (category 4) is executed in an LBT duration that applies in common to user terminals 1 and 2. Also, in FIGS. 9 to 11, the LBT duration that applies in common to user terminals 1 and 2 may be provided at the end of a UL subframe that is immediately before a scheduled UL subframe or at the top of the scheduled UL subframe (FIG. 8).

FIG. 9 is a diagram to show an example of the occurrence of an interrupt according to the third example. As shown in FIG. 9, after LBT is successfully finished (the idle state is detected) in an LBT duration, user terminals 1 and 2 extend LBT autonomously (self-deferral) and hold UL transmission until a UL transmission period starts at a fixed starting timing. In this case, there is a threat that other systems might cut in during the period between the end of LBT by user terminals 1 and 2 and the beginning of the UL transmission period. So, user terminals 1 and 2 may prevent other systems from cutting in, as shown in FIGS. 10 and 11.

Figure 10:
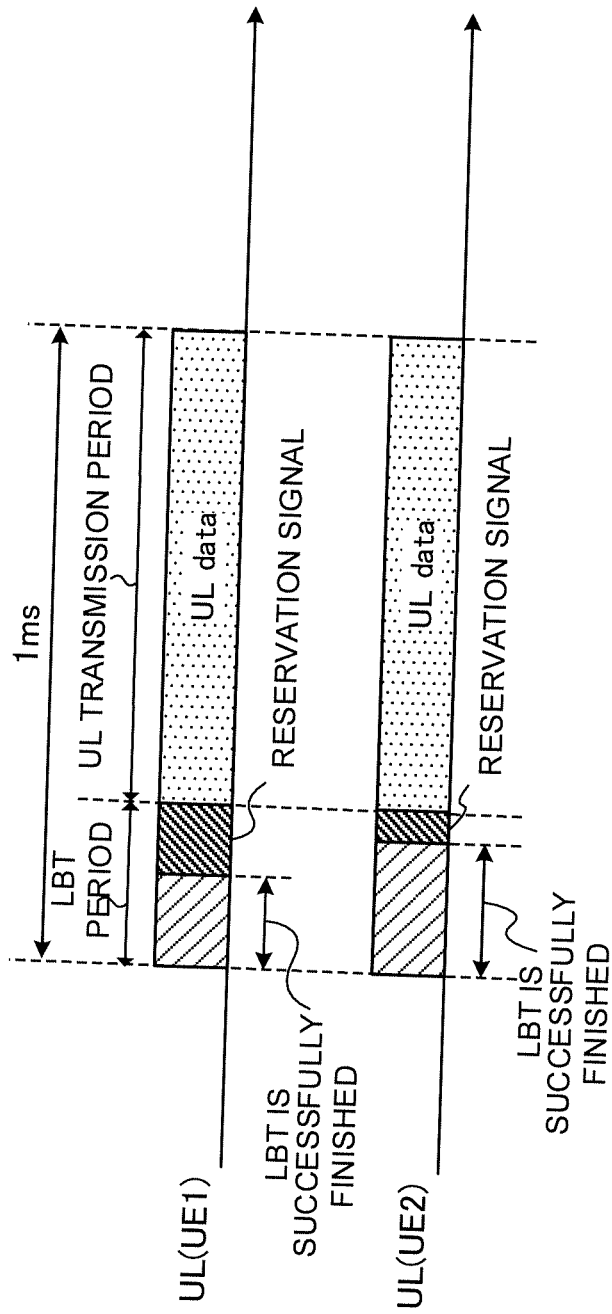
FIG. 10 is a diagram to show an example of a first example of guaranteed UL transmission according to the third example.

FIG. 10 is a diagram to show a first example of guaranteed UL transmission according to the third example. As shown in FIG. 10, after LBT is finished (the idle state is detected) in an LBT duration, user terminals 1 and 2 transmit reservation signals in all licensed band frequency resources until a UL transmission period starts at a fixed starting timing. By this means, it is possible to prevent, more reliably, other systems from interrupting during the period between the end of LBT in user terminals 1 and 2 and the beginning of a UL transmission period.

Also, referring to FIG. 10, each user terminal detects the reservation signals from other user terminals in the same cell, and subtracts the received power of the reservation signals from the received power measured in LBT. For example, in FIG. 10, user terminal 2 detects the reservation signals from user terminal 1 where LBT has been finished earlier than in user terminal 2, and subtracts the received power of the reservation signals from the received power measured in LBT. By this means, it is possible to prevent the reservation signals from user terminal 1 blocking LBT in user terminal 2.

Figure 11:
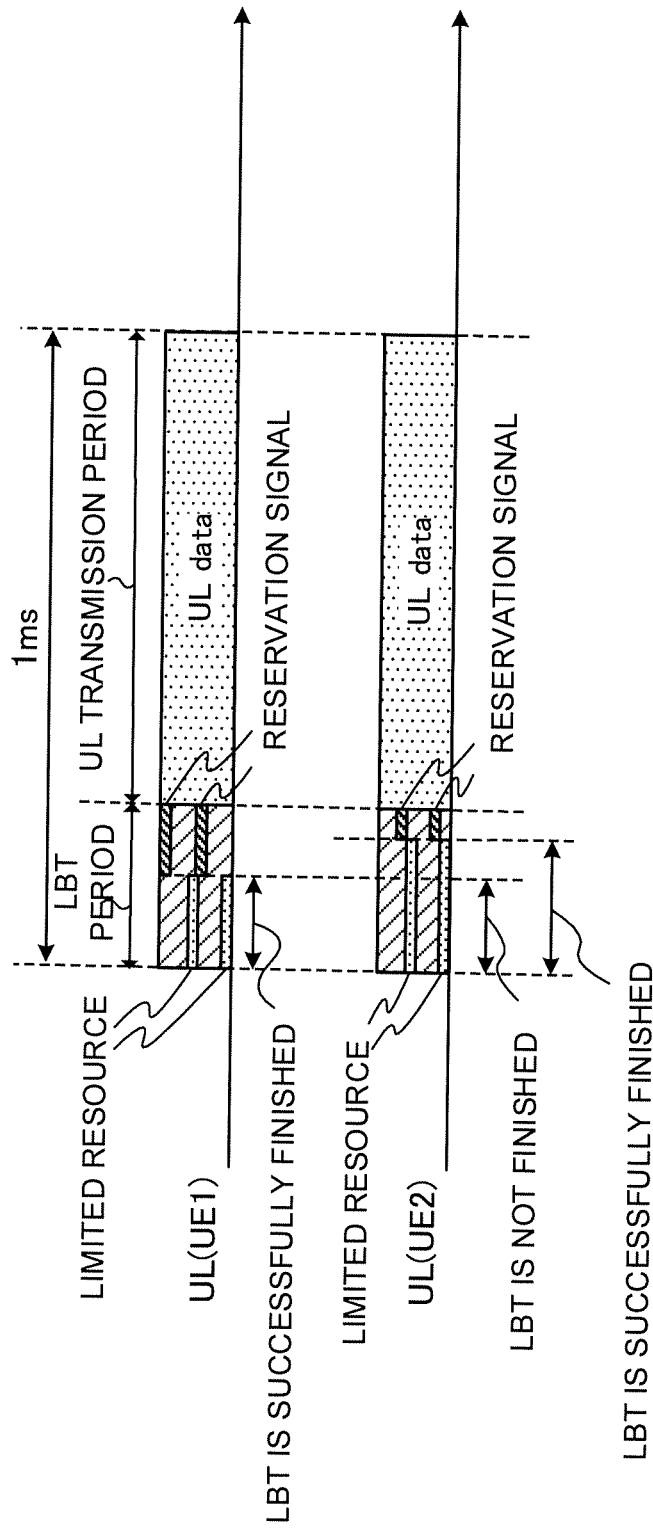
FIG. 11 is a diagram to show an example of a second example of guaranteed UL transmission according to the third example.

FIG. 11 is a diagram to a second example of guaranteed UL transmission according to the third example. As shown in FIG. 11, user terminals 1 and 2 perform LBT in all the frequency resources of a licensed band, and, furthermore, perform LBT in specific frequency resources (limited resources) of the licensed band. After LBT is finished (the idle state is detected) in an LBT duration, user terminals 1 and 2 transmit reservation signals by using part of the frequency resources of the licensed band, until a UL transmission period starts at a fixed starting timing. It is preferable if these partial frequency resources match the limited resources in which LBT is performed.

Also, when the idle state is detected in all the frequency resources (wideband), each user terminal judges that the channel (slot) is in the idle state. Meanwhile, even if all the frequency resources are in the busy state, if the idle state is detected in the limited resources, each user terminal judges that the channel is in the idle state. When the idle state is detected both in all the frequency resources and in the limited resources, each user terminal judges that the channel (slot) is in the idle state.

For example, in FIG. 11, user terminal 1, which has finished LBT earlier than user terminal 2, transmits reservation signals in frequency resources that are different from the limited resources. The reservation signals from user terminal 1 block user terminal 2's LBT in all the frequency resources, and therefore making user terminal 2 detect the busy state in all the frequency resources. Meanwhile, since user terminal 1 transmits reservation signal in frequency resources that are different from the limited resources, so that user terminal 2 detects the idle state in the limited resources, and finished LBT.

In FIG. 11, after LBT is successfully finished, reservation signals are transmitted in part of the frequency resources until a UL transmission period starts, so that it is possible to prevent other systems from interrupting. Furthermore, in addition to performing LBT (power detection) in all frequency resources, LBT is performed and the idle state is detected in limited resources as well, so that it is possible to prevent the reservation signals from user terminal 1 where LBT has been finished earlier from blocking LBT in user terminal 2.

Note that, in FIG. 11, the frequency resources in which reservation signals are transmitted may be cell-specific or may be user terminal-specific (UE-specific). Similarly, the reservation signal sequences may be cell-specific, or may be user terminal-specific. If the frequency resources and sequences for reservation signals are made cell-specific, the implementation can be simplified, but, on the other hand, there is a threat of increased interference in specific frequency resources.

On the other hand, when the frequency resources for reservation signals are made user terminal-specific, it is possible to distribute interference over frequencies. Furthermore, when the reservation signal sequences are made user terminal-specific, it is possible to use the reservation signals in channel estimation like sounding reference signals (SRSs).

Fourth Example

With a fourth example, too, a case to perform LBT based on LBE (category 4) will be described. According to the second example, the duration of LBT (listening period) based on LBE (category 4) is fixed (the same) among a plurality of user terminals that are scheduled in one or a plurality of subframes in the same UL burst transmission period (burst transmission period).

According to the fourth example, an LBT duration is configured before a UL burst transmission period in which at least one UL subframe is included. The UL subframes in the UL burst transmission period are scheduled for each user terminal, and, based on the result of LBT in this LBT duration, each user terminal makes UL transmission in its scheduled UL subframe. That is, the fourth example may be seen as a combination of the third example, in which LBT is executed based on LBE (category 4), with the second example. Differences between the second and the third example will be primarily described below.

Figure 12:
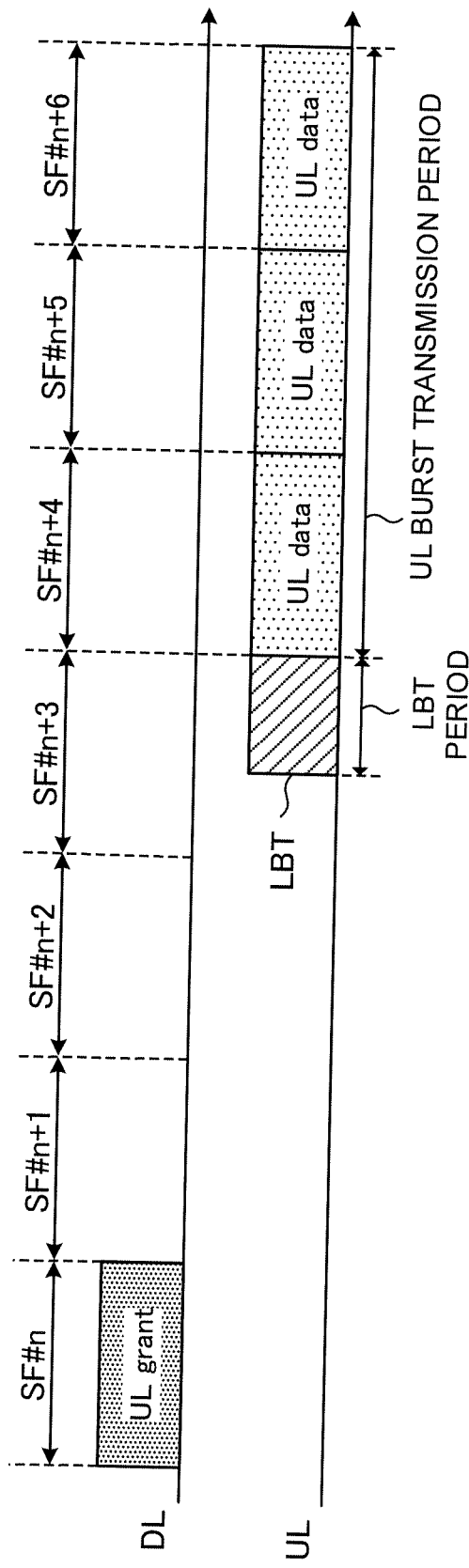
FIG. 12 is a diagram to show an example of UL transmission based on LBT (LBE), according to a fourth example.

FIG. 12 is a diagram to show an example of UL transmission according to the fourth example. In FIG. 12, an LBT duration that applies in common to at least one user terminal where UL subframes #n+4 to #n+6 in a UL burst transmission period are scheduled is configured at the end of a UL subframe that is immediately before the UL burst transmission period.

Also, in FIG. 12, in DL subframe #n, UL grants that each schedule at least one of UL subframes #n+4 to #n+6 in the UL burst transmission period are transmitted to user terminals. Each user terminal executes LBT in the LBT duration before the UL burst transmission period, and makes UL transmission in the UL subframe that is scheduled by the UL grant.

In FIG. 12, the scheduling method that has been described with the second example can be used to schedule at least one UL subframe in the UL burst transmission period. To be more specific, the DCI including the above UL grants contains subframe information that indicates the scheduled UL subframes. As has been described earlier with reference to FIGS. 6 and 7, this subframe information can be a bit value to represent the offset (difference) between the subframe, in which a UL grant (DCI) to schedule a UL subframe in the UL burst transmission period is transmitted, and this UL subframe.

Also, referring to FIG. 12, after LBT is successfully finished in the LBT duration (the idle state is detected), it is possible to apply the examples of guaranteed UL transmission (FIGS. 10 and 11) that have been described with the third example, until the UL subframes that are scheduled by the UL grants start.

For example, referring to FIG. 12, after the user terminal where UL subframe #n+4 is scheduled successfully finishes LBT in the middle of the LBT duration, this user terminal may transmit reservation signals using part or all of the frequency resources, until UL subframe #n+4 starts (FIGS. 10 and 11).

Furthermore, still referring to FIG. 12, after the user terminal where UL subframe #n+5 is scheduled successfully finishes LBT in the middle of the LBT duration, this user terminal may transmit reservation signals by using part or all of the frequency resources, until UL subframe #n+5 starts (that is, in subframe #n+4 in the UL burst transmission period, too) (FIGS. 10 and 11).

(Radio Communication System)

Now, the structure of the radio communication system according to an embodiment of the present invention will be described below. In this radio communication system, the radio communication methods according to the embodiments of the present invention are employed. Note that the radio communication methods of the above-described example s may be applied individually or may be applied in combination.

Figure 13:
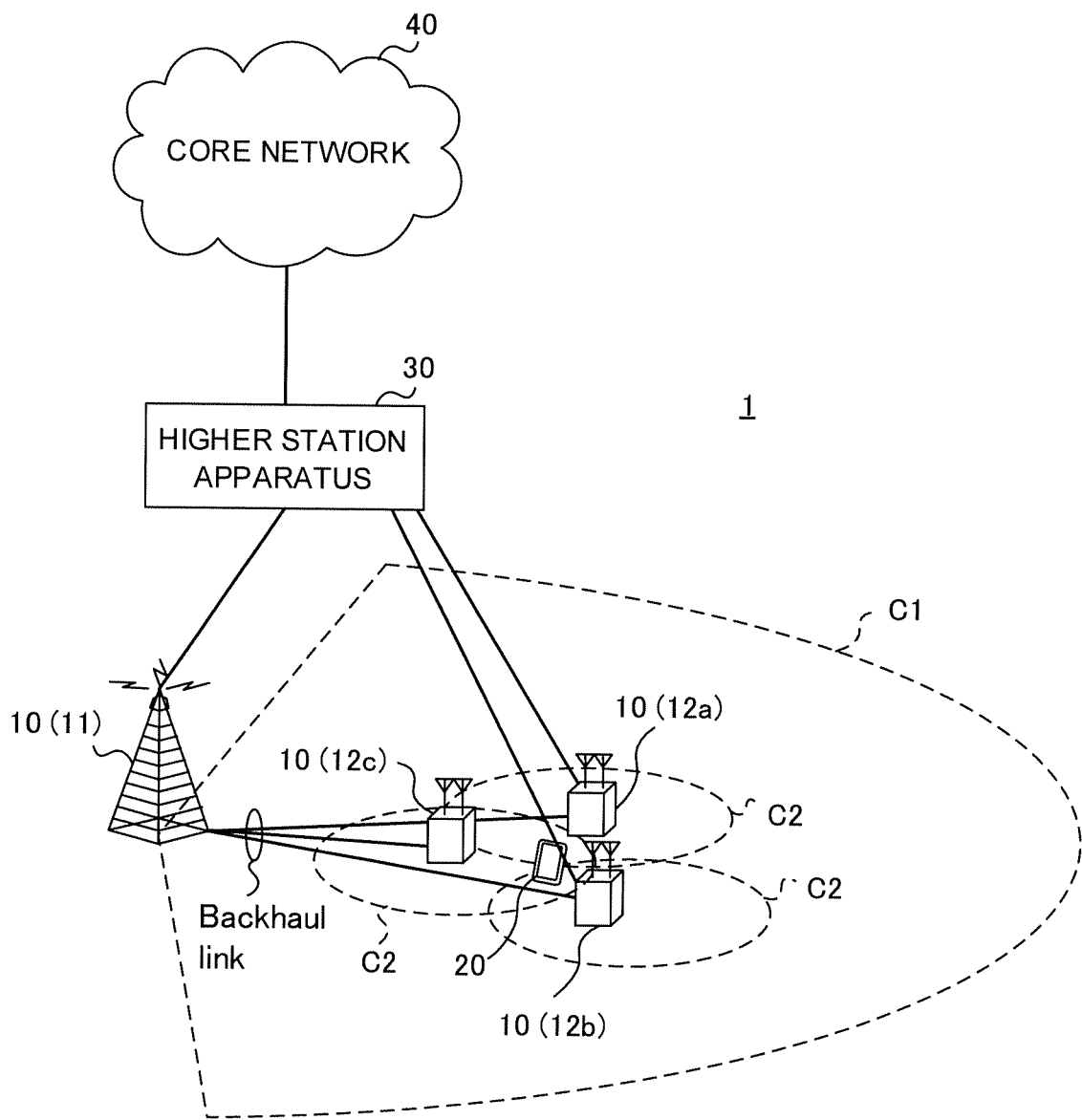
FIG. 13 is a schematic diagram to show an example of a radio communication system according to the present embodiment.

FIG. 13 is a diagram to show an example of a schematic structure of a radio communication system according to an embodiment of the present invention. Note that the radio communication system shown in FIG. 13 is a system to incorporate, for example, an LTE system, super 3G, an LTE-A system and so on. In this radio communication system, carrier aggregation (CA) and/or dual connectivity (DC) to bundle multiple component carriers (CCs) into one can be used. Also, these multiple CCs include licensed band CCs to use licensed bands and unlicensed band CCs to use unlicensed bands. Note that this radio communication system may be referred to as "IMT-Advanced," or may be referred to as "4G," "5G," "FRA" (Future Radio Access) and so on.

The radio communication system 1 shown in FIG. 13 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA by using at least two CCs (cells), or use six or more CCs.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, MIBs (Master Information Blocks) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

Also, as downlink reference signals, cell-specific reference signals (CRSs), channel state measurement reference signals (CSI-RSs: channel State Information-Reference Signals), user-specific reference signals (DM-RSs: Demodulation Reference Signals) for use for demodulation, and other signals are included.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgment signals (HARQ-ACKs) and so on are communicated by the PUCCH. By means of the PRACH, random access preambles (RA preambles) for establishing connections with cells are communicated.

<Radio Base Station>

Figure 14:
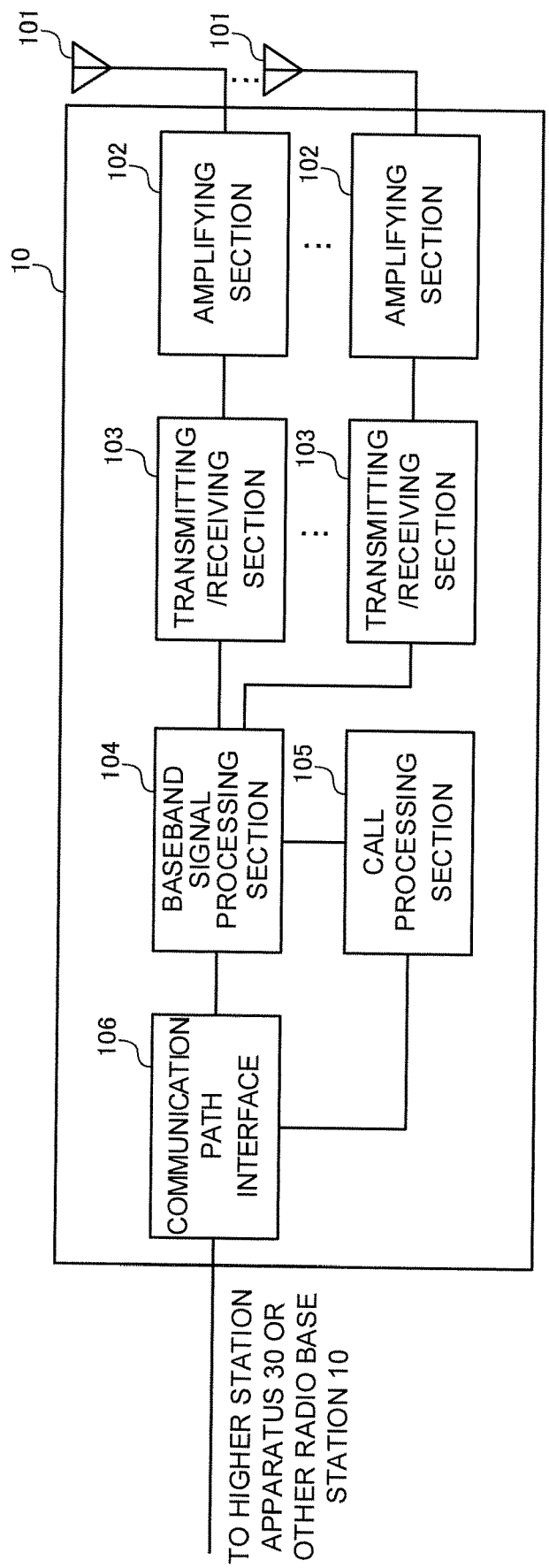
FIG. 14 is a diagram to explain an overall structure of a radio base station according to the present embodiment.

FIG. 14 is a diagram to show an example of an overall structure of a radio base station according to an embodiment of the present invention. A radio base station 10 has a plurality of transmitting/receiving antennas 10, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

For example, the transmitting/receiving sections (transmitting sections) 103 transmit UL transmission commands (UL grants). Also, the transmitting/receiving sections (transmitting sections) 103 may transmit subframe information that represents one or a plurality of UL subframes scheduled in a user terminal 20. Also, when the transmitting/receiving sections 103 transmit DL signals in an unlicensed band, the transmitting/receiving sections 103 can transmit the DL signal based on the result of listening that is executed before this DL signal is transmitted.

Also, the transmitting/receiving sections (receiving sections) 103 receive UL signals that are transmitted from each of a plurality of user terminals 20 scheduled in the same subframe or in UL subframes in the same UL burst period based on the result of listening. Note that, for the transmitting/receiving sections 103, transmitters/receivers, transmitting/receiving circuits or transmitting/receiving devices that can be described based on common understanding of the technical field to which the present invention pertains can be used.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. The communication path interface 106 transmits and receives signals to and from neighboring radio base stations 10 (backhaul signaling) via an inter-base station interface (for example, optical fiber, the X2 interface, etc.).

Figure 15:
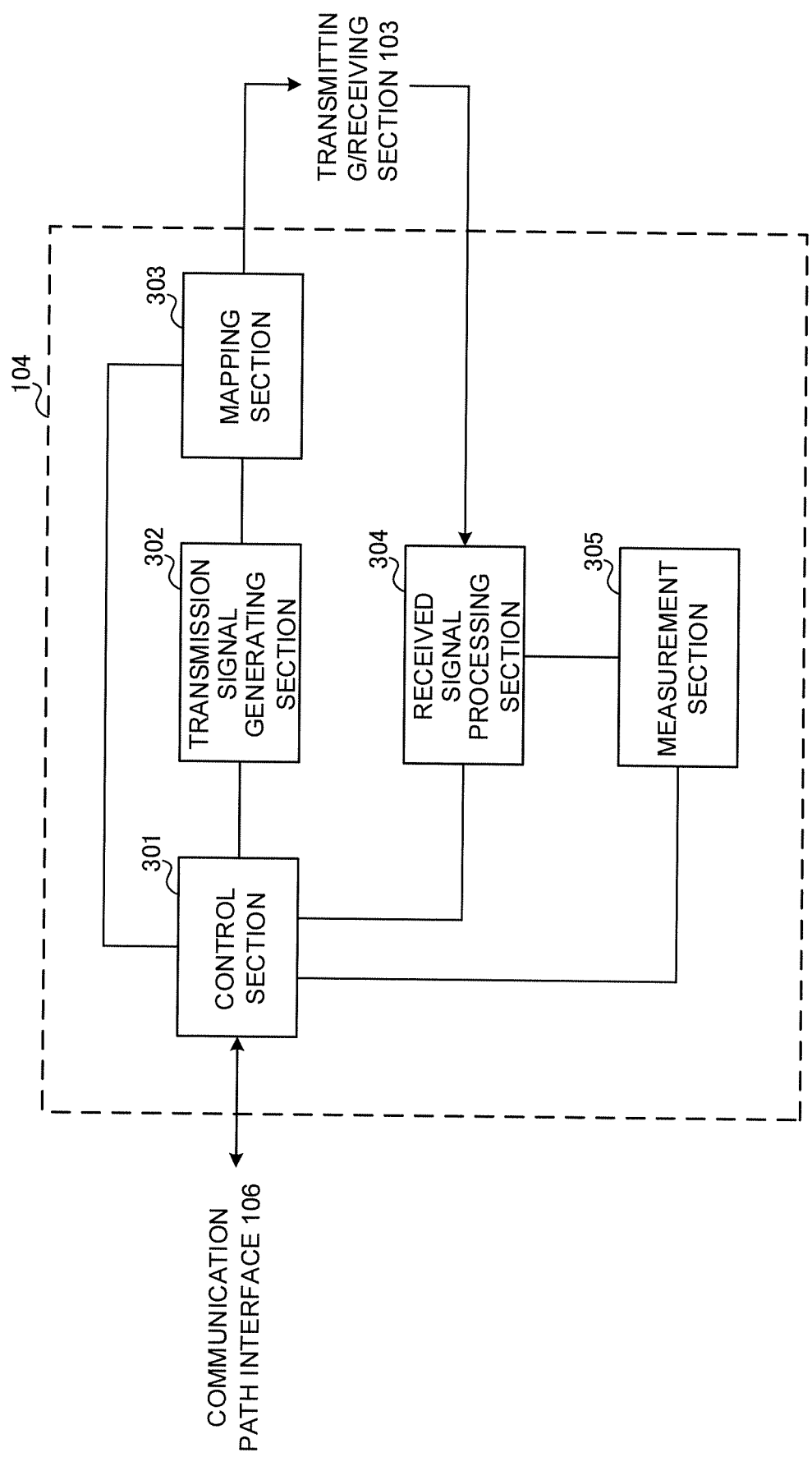
FIG. 15 is a diagram to explain a functional structure of a radio base station according to the present embodiment.

FIG. 15 is a diagram to show an example of a functional structure of a radio base station according to the present embodiment. Note that, although FIG. 15 primarily shows functional blocks that pertain to characteristic parts of the present embodiment, the radio base station 10 has other functional blocks that are necessary for radio communication as well. As shown in FIG. 15, the baseband signal processing section 104 has a control section (scheduler) 301, a transmission signal generating section (generating section) 302, a mapping section 303, a received signal processing section 304 and a measurement section 305.

The control section (scheduler) 301 controls the scheduling (for example, resource allocation) of downlink data signals that are transmitted in the PDSCH and downlink control signals that are communicated in the PDCCH and/or the EPDCCH. Furthermore, the control section (scheduler) 301 also controls the scheduling of system information, synchronization signals, paging information, CRSs, CSI-RSs and so on.

Also, the control section 301 controls the scheduling of uplink reference signals, uplink data signals that are transmitted in the PUSCH, uplink control signals that are transmitted in the PUCCH and/or the PUSCH, random access preambles that are transmitted in the PRACH, and so on. Also, the control section 301 controls the scheduling of user terminal 20 in a licensed band cell. For example, the control section 301 schedules a plurality of user terminal 20 in the cell in the same subframe. Also, the control section 301 controls the transmission of DL signals based on the result of listening (DL LBT).

Note that, for the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report DL signal allocation information, and UL grants, which report uplink signal allocation information, based on commands from the control section 301. Also, the transmission signal generating section 302 can include the above subframe information in DL signals that are transmitted in an unlicensed band. Note that, for the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined radio resources based on commands from the control section 301, and outputs these to the transmitting/receiving sections 103. Note that, for the mapping section 303, mapper, a mapping circuit or a mapping device that can be described based on common understanding of the technical field to which the present invention pertains can be used.

The receiving process section 304 performs receiving processes (for example, demapping, demodulation, decoding and so on) of UL signals (for example, delivery acknowledgement signals (HARQ-ACKs), data signals that are transmitted in the PUSCH, and so on) transmitted from the user terminals. The processing results are output to the control section 301. For the received signal processing section 304, a signal processor/measurer, a signal processing/measurement circuit or a signal processing/measurement device that can be described based on common understanding of the technical field to which the present invention pertains can be used.

Also, by using the received signals, the measurement section 305 may measure the received power (for example, the RSRP (Reference Signal Received Power)), the received quality (for example, the RSRQ (Reference Signal Received Quality)), channel states and so on. Also, upon listening before DL signal transmission in unlicensed bands, the measurement section 305 can measure the received power of signals transmitted from other systems and/or the like. The results of measurements in the measurement section 305 are output to the control section 301. The control section 301 can control the transmission of DL signals based on measurement results (listening results) in the measurement section 305.

The measurement section 305 can be constituted by a measurer, a measurement circuit or a measurement device that can be described based on common understanding of the technical field to which the present invention pertains.

<User Terminal>

Figure 16:
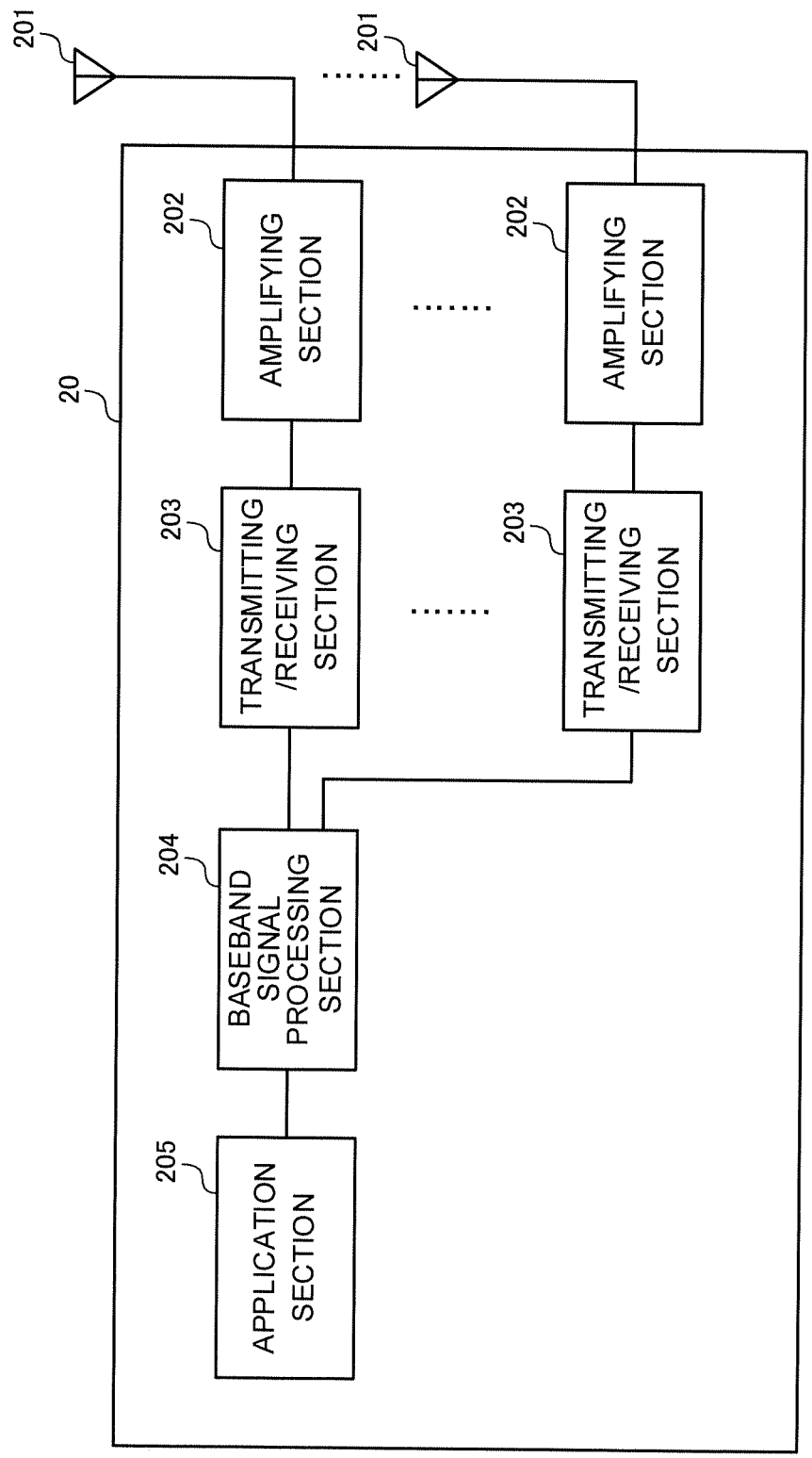
FIG. 16 is a diagram to explain an overall structure of a user terminal according to the present embodiment.

FIG. 16 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204.

The transmitting/receiving sections (receiving sections) 203 can receive DL signals (for example, UL grants) that commands DL transmission in unlicensed bands. Also, the transmitting/receiving sections (receiving sections) 203 may receive subframe information that represents one or a plurality of UL subframes scheduled in a user terminal 20.

Also, when the transmitting/receiving sections 203 transmit UL signals in an unlicensed band, the transmitting/receiving sections 103 can transmit the UL signals based on the result of listening that is executed before these DL signals are transmitted. Note that, for the transmitting/ receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 17:
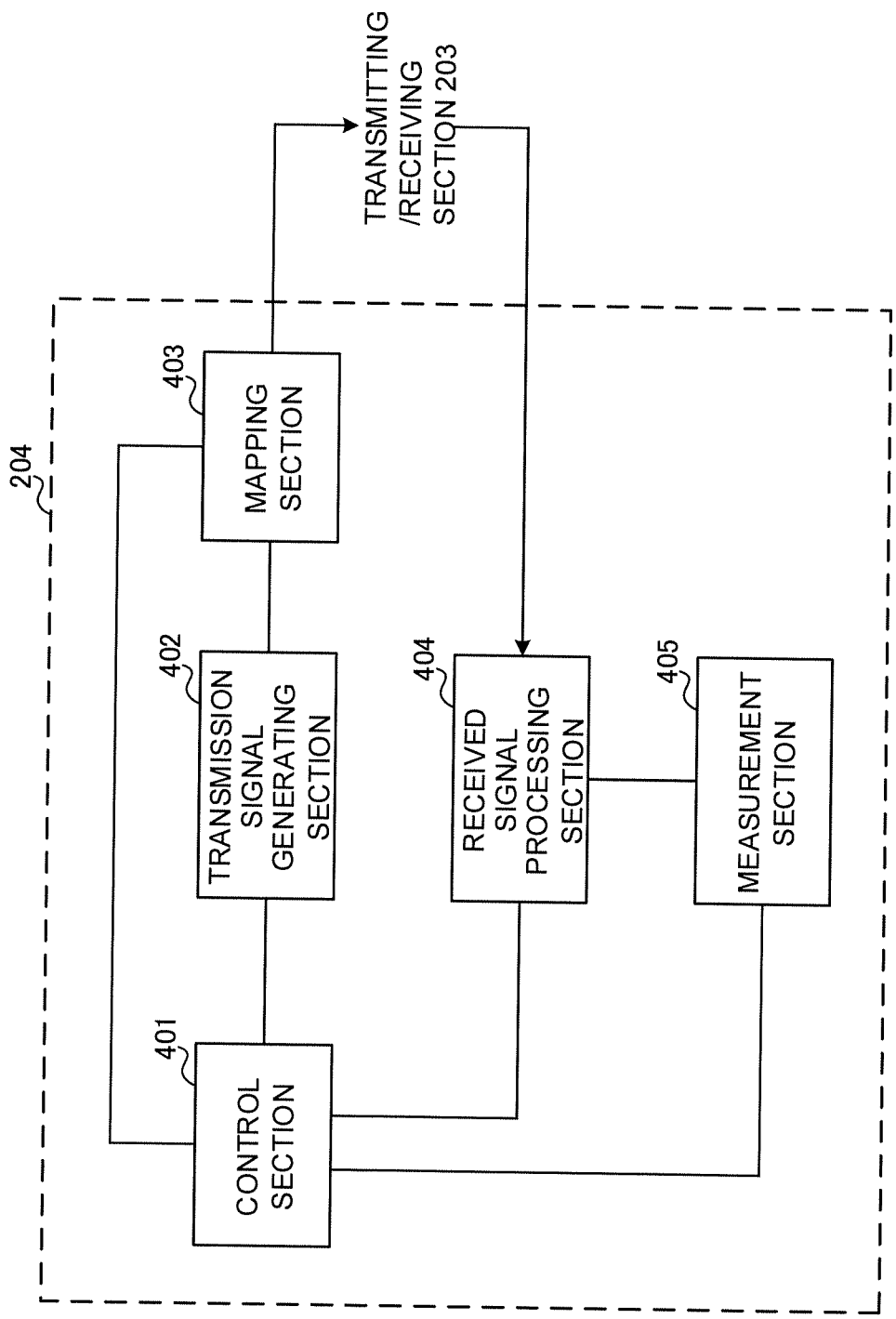
FIG. 17 is a diagram to explain a functional structure of a user terminal according to the present embodiment.

FIG. 17 is a diagram to show an example of a functional structure of a user terminal according to the present embodiment. Note that, although FIG. 17 primarily shows functional blocks that pertain to characteristic parts of the present embodiment, the user terminal 20 has other functional blocks that are necessary for radio communication as well. As shown in FIG. 17, the baseband signal processing section 204 provided in the user terminal 20 has a control section 401, a transmission signal generating section 402, a mapping section 403, a received signal processing section 404 and a measurement section 405.

The control section 401 can control the transmission signal generating section 402, the mapping section 403 and the received signal processing section 404. For example, the control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation/transmission (UL transmission) of uplink control signals (for example, HARQ-ACKs and so on) and uplink data based on downlink control information (UL grants), the result of deciding whether or not retransmission control is necessary for downlink data, and so on. Also, the control section 401 controls the transmission of UL signals based on the result of listening (UL LBT).

To be more specific, the control section 401 may make the LBT duration (listening period) and the UL transmission period (transmission period) the same among a plurality of user terminals 20 scheduled in the same subframe (the first and the third example). Note that, in this LBT duration, it is possible to perform FBE-based LBT or perform LBT based on LBE (category 4).

Alternatively, when LBT is executed based on LBE (category 4), the control section 401 may exert control so that, after LBT is finished in an LBT duration, reservation signals are transmitted by using all of the frequency resources for LBT, until a UL transmission period starts (the third example, FIG. 10). In this case, the control section 401 may judge the result of LBT based on the power detection results in all frequency resources and the detection results of reservation signals that are transmitted from other user terminals 20 by using all of these frequency resources.

Alternatively, when LBT is executed based on LBE (category 4), the control section 401 may exert control so that, after LBT is finished in an LBT duration, reservation signals are transmitted by using frequency resources that are different from specific resources in which other user terminals 20 detect power, until a UL transmission period starts (the third example, FIG. 11). In this case, the control section 401 may judge the result of LBT based on the power detection results in all frequency resources and the power detection results in the specific frequency resources.

Also, the control section 401 may make the LBT duration the same among a plurality of user terminals 20 that are scheduled in one or a plurality of subframes in the same UL burst transmission period (burst transmission period) (the second and fourth examples). Note that, in this LBT duration, it is possible to perform FBE-based LBT or perform LBT based on LBE (category 4).

When FBE-based LBT is executed, the control section 401 may exert control so that, after an LBT duration is finished, reservation signals are transmitted by using part of the frequency resources for LBT, until one or a plurality of subframes represented by subframe information start (the second example, FIG. 5).

Alternatively, when LBT is executed based on LBE (category 4), the control section 401 may exert control so that, after LBT is finished in an LBT duration, reservation signals are transmitted by using all of the frequency resources for LBT, until one or a plurality of subframes represented by subframe information start (fourth example). In this case, the control section 401 may judge the result of LBT based on the power detection results in all frequency resources and the detection results of reservation signals that are transmitted from other user terminals 20 by using all of these frequency resources.

Alternatively, when LBT is executed based on LBE (category 4), the control section 401 may exert control so that, after LBT is finished in an LBT duration, reservation signals are transmitted by using frequency resources that are different from specific resources in which other user terminals 20 detect power, until one or a plurality of subframes represented by subframe information start (the fourth example). In this case, the control section 401 may judge the result of LBT based on the power detection results in all frequency resources and the power detection results in the specific frequency resources. Note that, for the control section 401, a controller, a control circuit or a control device that can be described based on common understanding of the technical field to which the present invention pertains can be used.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs) in response to DL signals, channel state information (CSI) and so on, based on commands from the control section 401.

Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. For the transmission signal generating section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs the receiving processes (for example, demapping, demodulation, decoding and so on) of the DL signals (for example, downlink control signals that are transmitted from the radio base station in the PDCCH/EPDCCH, downlink data signals transmitted in the PDSCH, and so on). The received signal processing section 404 outputs the information received from the radio base station 10, to the control section 401 and the measurement section 405. Note that, for the received signal processing section 404, a signal processor/measurer, a signal processing/measurement circuit or a signal processing/measurement device that can be described based on common understanding of the technical field to which the present invention pertains can be used. Also, the received signal processing section 404 can constitute the receiving section according to the present invention.

Also, the measurement section 405 may measure the received power (for example, the RSRP (Reference Signal Received Power)), the received quality (for example, the RSRQ (Reference Signal Received Quality)), channel states and so on, by using the received signals.

Furthermore, upon listening that is executed before UL signals are transmitted in unlicensed bands, the measurement section 405 can measure the received power of signals transmitted from other systems and so on, based on commands from the control section 401. The results of measurements in the measurement section 405 are output to the control section 401. The control section 401 can control the transmission of UL signals based on measurement results (listening results) in the measurement section 405. The measurement section 405 can be constituted by a measurer, a measurement circuit or a measurement device that can be described based on common understanding of the technical field to which the present invention pertains.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU: Central Processing Unit), a communication interface for connecting with networks, a memory and a computer-readable storage medium that holds programs. That is, the radio base stations and user terminals according to an embodiment of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "carrier frequencies," "cells" and so on.

Also, the information and parameters described in this description may be represented in absolute values or in relative values with respect to a predetermined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The example s/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (MIBs (Master Information Blocks) and SIBs (System Information Blocks))), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-187383, filed on Sep. 24, 2015, including the specification, drawings and abstract, is incorporated herein by reference in its entirety.

The invention claimed is:

1. A terminal that communicates in a cell where listening is executed before uplink (UL) signal transmission, the terminal comprising:
   a receiver that receives a single downlink control information (DCI) for scheduling a plurality of UL data signals;
   a transmitter that transmits the plurality of UL data signals in a UL transmission period, the plurality of UL data signals being consecutive UL data signals; and
   a processor that controls transmission of the plurality of UL data signals, after the listening, based on a result of the listening;
   wherein the receiver receives first information about an offset from a starting position of a subframe, second information about an offset between a subframe for receiving the DCI and one or a plurality of subframes to which the UL data signals are scheduled, and information about a duration of the listening,
   the processor controls the duration of the listening based on information about the duration of the listening, and the processor determines a timing of the UL transmission period based on the first information and the second information, and
   the processor controls to make an end-of-listening timing the same among a plurality of terminals in which a transmission of the UL data signals are scheduled in a same subframe.

2. The terminal according to claim 1, wherein the duration of the listening is 25 µs.

3. A radio communication method for a terminal that communicates in a cell where listening is executed before uplink (UL) signal transmission, the radio communication method comprising:
   receiving a single downlink control information (DCI) for scheduling a plurality of UL data signals;
   transmitting the plurality of UL data signals in a UL transmission period, the plurality of UL data signals being consecutive UL data signals;
   controlling transmission of the plurality of UL data signals, after the listening, based on a result of the listening; and
   receiving first information about an offset from a starting position of a subframe, second information about an offset between a subframe for receiving the DCI and one or a plurality of subframes to which the UL data signals are scheduled, and information about a duration of the listening,
   wherein the terminal controls the duration of the listening based on information about the duration of the listening, and the terminal determines a timing of the UL transmission period based on the first information, and
   the terminal controls to make an end-of-listening timing the same among a plurality of terminals in which a transmission of the UL data signals are scheduled in a same subframe.

4. A system comprising: a terminal that communicates in a cell where listening is executed before uplink (UL) signal transmission; and a base station, wherein
   the terminal comprises:
      a receiver that receives a single downlink control information (DCI) for scheduling a plurality of UL data signals;
      a transmitter that transmits the plurality of UL data signals in a UL transmission period, the plurality of UL data signals being consecutive UL data signals; and
      a processor that controls transmission of the plurality of UL data signals, after the listening, based on a result of the listening;
      wherein the receiver receives first information about an offset from a starting position of a subframe, second information about an offset between a subframe for receiving the DCI and one or a plurality of subframes to which the UL data signals are scheduled, and information about a duration of the listening,
      the processor controls the duration of the listening based on information about the duration of the listening, and the processor determines a timing of the UL transmission period based on the first information and the second information, and
      the processor controls to make an end-of-listening timing the same among a plurality of terminals in which a transmission of the UL data signals are scheduled in a same subframe, and
   the base station comprises:
      a receiver that receives the plurality of UL data signals.

* * * * *